3,280,161
CYCLOPENTENYL AND CYCLOPENTYL
DITHIOCARBAMATES
Enrico Knusli and Kurt Gubler, Riehen, near Basel, Switzerland, assignors to J. R. Geigy, A.-G., Basel, Switzerland
No Drawing. Original application Jan. 17, 1962, Ser. No. 166,942. Divided and this application Apr. 11, 1963, Ser. No. 281,852
Claims priority, application Switzerland, Jan. 18, 1961, 615/61
5 Claims. (Cl. 260—455)

The present application is a division of copending application Serial No. 166,942, filed January 17, 1962.

This invention relates to new dithiocarbamic acid derivatives.

The new dithiocarbamic acid derivatives are dithiocarbamates of the general formula

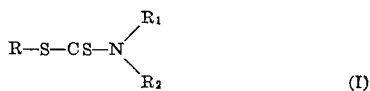

wherein R signifies the cyclopentene-(2)-yl- or cyclopentyl radical, which radicals may be substituted by one or two halogen atoms or hydroxyl groups, of these radicals the cyclopentene-(2)-yl- and the chlorocyclopentene-(2)-yl radical being particularly advantageous, and $R_1$ and $R_2$ independently of each other represent hydrogen or lower alkyl.

In the above, lower alkyl is an alkyl containing 1–4 carbon atoms, e.g. methyl, ethyl, propyl, isopropyl, butyl, tert. butyl and sec. butyl. Preferred compounds are those wherein $R_1$ represents hydrogen and $R_2$ is lower alkyl, or wherein $R_1$ and $R_2$ represent both the same lower alkyl.

It has been found that these dithiocarbamates of Formula I have an excellent effect against nematodes in the soil which are harmful to plants, and moreover are very stable, have little phytotoxicity and are practically non-irritant. The new active substances have no unpleasant smell and in addition also possess fungicidal activity, especially against fungi living in the soil.

The new active substances of the general Formula I are prepared according to a first method, by reacting, preferably in an aqueous medium or in an organic medium, immiscible with water, a cyclopentene-(2)-yl- or cyclopentyl-halide, possibly substituted by hydroxyl or halogen, with a salt of dithiocarbamic acid of the general formula

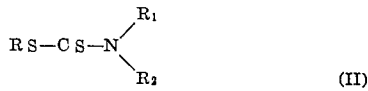

in which $R_1$ and $R_2$ have the meaning given above. Benzene solutions are especially suitable as organic media. Salts of dithiocarbamic acids of the general Formula II which are used are preferably the alkali metal salts, e.g. the salts of sodium or potassium, and also the ammonium salts.

As cyclopentyl- or cyclopentenyl-halides the chlorides are preferably used. These starting substances are known or can easily be prepared by known methods. For example, the following compounds may be mentioned as such halides: cyclopentyl chloride, cyclopentene-(2)-yl chloride, 1,2-dibromocyclopentene-(3), 1,2- or 1,3-dichlocyclopentene-(2) and so forth.

The reaction with the dithiocarbamic acid salt is carried out at a temperature between 10 and 90° C., depending on the solvent or diluent, the usually liquid end products being obtained in good yield and in the purity required for use.

According to a second process, the active substances of Formula I may also be obtained when a mercaptocyclopentene-(2) or mercaptocyclopentane, possibly substituted by hydroxyl groups or halogen, is first reacted with thiophosgene in the presence of a hydrochloric acid-binding agent to give dithiocarbonic acid-cyclopentenyl ester-chloride or dithiocarbonic acid-cyclopentyl ester-chloride, and the latter is converted with ammonia or a mono- or dialkylamine into the end product of the general Formula I. According to a variant of this process N-monoalkyl-dithiocarbamic acid esters of the general Formula I may also be obtained directly when the mercaptocyclopentane or mercaptocyclopentene, possibly substituted by halogen or hydroxyl groups, is reacted with alkyl-isothiocyanates in the hot, preferably in benzene. N-dialkyl-dithiocarbamic acid esters of the general Formula I are also directly obtainable from the possibly substituted mercaptocyclopentene or mercaptocyclopentane by reacting with N-dialkyl-thiocarbamyl halides in the hot, preferably in the presence of an acid-binding agent.

Finally, active substances of the general Formula I may also be obtained when a cyclopentene or cyclopentadiene possibly substituted by hydroxyl or halogen, is admixed with a salt of dithiocarbamic acid of the general Formula II and treated with mineral acid in the cold, e.g., at −15 to +5° C., when the liberated dithiocarbamic acid of Formula II is added on to the double bond of the cyclopentene or to a double bond of the cyclopentadiene, with formation of active substances of the general Formula I.

Preferred active substances of the general Formula I are N-monoalkyl-substituted dithiocarbamates, in which one of the residues $R_1$ and $R_2$ represents hydrogen and the other a lower alkyl group, especially a methyl group.

In the following examples the production of the new compounds according to the invention is illustrated more precisely. Parts therein signify parts by weight, and the temperatures are given in degrees centigrade.

EXAMPLE 1

To prepare the starting salt, 427.5 parts of a 35% aqueous solution of methylamine are allowed to flow at a temperature of 10–12° with good stirring into a mixture of 342 parts of carbon disulphide and 900 parts by volume of water, and stirring is continued for half an hour at the same temperature. A solution of 180 parts of NaOH in 900 parts by volume of water is subsequently added at 10–12° and the mixture is then stirred for a further 2–3 hours at room temperature, when the sodium salt of the monomethyl-dithiocarbamic acid is formed in the solution. 343 parts of cyclopentenyl chloride are slowly added at a temperature of 10–12° with vigorous stirring to the clear aqueous solution of the above salt, when the desired N-methylcyclopentene-(2)-yl-dithiocarbamate is obtained as an oil. To complete the reaction, stirring is continued for a few hours at 40–70°, the product is separated, dissolved in 1000 parts by volume of ether and washed three times with water. After drying the ethereal solution, the ether is distilled off. The oil remaining is kept for 20 hours at 50–60° under the action of the high vacuum pump, in order to suck off readily volatile impurities. The product is obtained in a good state of purity, but it cannot be distilled without decomposition.

In an analogous way the following active substances of the general Formula I are obtained by reaction of cyclopentenyl chloride or of 1,2- or 1,3-dichlorcyclopentene-(2) with correspondingly prepared alkali metal salts of N-alkyl-dithiocarbamic acids:

N-dimethyl-cyclopentene-(2)-yl-dithiocarbamate,
B.P.=103–105° C./0.01 mm.
N-diethyl-cyclopentene-(2)-yl-dithiocarbamate,
B.P.=99–102° C./0.004 mm.
N-dimethyl-2- or 3-chlorocyclopentene-(2)-yl-dithiocarbamate, M.P.=37.5–39.5°.

EXAMPLE 2

20 parts by volume mercaptocyclopentene-(2) and 1 part by volume triethylamine are admixed with 20 parts by volume benzene. While stirring, 22 parts by volume methyl isothiocyanate are added dropwise, whereby the temperature rises to 40°. The reaction mixture is then refluxed for 12 hours with stirring. The benzene solution is worked up by washing twice with an ice cold 2 N soda lye and twice with water. The benzene solution is dried over sodium sulphate and the solvent distilled in vacuo. The residue is pure N-methyl-cyclopentene-(2)-yl-dithiocarbamate which is collected in good yield. The product decomposes in distillation. In the further examples the methods of testing used to determine the activity, as well as a few typical forms of application of the new active substances, are illustrated.

The application of the new compounds of Formula I to the control of nematodes may be effected in solid form, for example as a finely powdered scattering agent or as a granulate, and also in liquid form as an emulsion, suspension, spray liquor or solution. For use, a solid or liquid agricultural carrier can be employed. The choice of the form of application depends upon the intended method of application, which in its turn depends especially on the kind of nematodes to be controlled, the cultivated plants to be protected, the climate and the soil conditions, as well as the technical operating conditions.

An even as possible a distribution of the active substances throughout a layer of earth about 15–25 cm. deep can be advantageous, the amount of active substance required in this case being generally about 50–250 kg. per hectare. It is also possible, however, to make a particular application, for example, one limited to dibber holes or furrows and, sometimes, even a sufficient protective action is attained with a reduced amount of active substance.

Dusts and scattering agents are especially suitable for application to unplanted areas, before or simultaneously with the harrowing or other mechanical soil cultivation which ensures a fine distribution of the agent in the topmost layer of soil. Further, these agents may also be dusted or scattered in seed drills or in furrows drawn between existing plants.

On the one hand, dusts may be produced by mixing or grinding together the active substances with a solid pulverulent, water-insoluble or sparingly soluble carrier substance. As such may be used, for example, talcum, diatomaceous earths, kieselguhr, kaolin, bentonite, calcium carbonate, boric acid or tricalcium phosphate. On the other hand, the active substances may also be mounted on the carrier substances by means of a volatile solvent. For the production of scattering agents and granulates, either carriers which are themselves coarser grained and/or specifically heavier, such as for example, coarsely ground limestone or sand, may be used, or mixtures of the active substance with finer grained, possibly porous, carriers may be granulated.

Further, scattering agents may also contain as carriers in coarse-grained, possibly granulated, form, solid substances of relatively great solubility in water or citrate for example, artificial fertilizers such as decomposed calcium phosphates or other calcium, potassium or ammonium salts, phosphates or nitrates.

Emulsions may be applied both to unplanted land and, owing to their penetrating power, to existing plantations.

For their production the active substances, after dissolving in organic solvents, such as, for example, xylene, may be emulsified in water which contains a surface-active substance. For the application of emulsions it is usually advantageous in practice first to prepare concentrates by combination of the active substance with inert organic solvents and/or suitable emulsifiers, which may be treated with water to give emulsions ready for use.

Suspensions may be obtained by suspending wettable powders, which themselves are prepared by combination of the solid active substance with surface-active substances and with solid pulverulent carriers.

A suitable form of application also consists in the use of unadulterated solutions of active substances according to the invention such as, for example, in halogenated hydrocarbons or in mineral oils etc.

The active substances according to the invention in the amounts used in practice have no phytotoxic action. If desired, the biological activity of the agents according to the invention may be supplemented by addition of fungicidal, herbicidal or insecticidal substances, or of further nematocidal substances. Combination with other plant protecting agents or any optional ingredients which influence the nematocidal action in any one desired direction, is also possible. Some of the new compounds possess also a pronounced fungicidal action and are able to destruct harmful soil fungi.

EXAMPLE 3

The quantity of the dithiocarbamic acid derivative to be tested required for attaining the desired concentration of active substances (quantity consumed) is taken up in 20 ml. of washed dry sand, finely pulverized and intimately mixed, then the mixture so obtained is admixed with 100 ml. of soil infected with Meloidogyne larvae (*M. arenaria*) placed in a wide-necked bottle, which is closed, and kept for at least 10 days. The gaseous action is determined at the same time by a special additional device. After the expiry of this time the two amounts of soil are extracted and the surviving nematodes are determined and compared with the control.

|  | N-methyl-cyclopentene-(2)-yl-dithiocarbamate, p.p.m. | | | | |
| --- | --- | --- | --- | --- | --- |
|  | 400 | 200 | 100 | 50 | 25 |
| Direct effect | ♦♦♦ | ♦♦♦ | ♦♦♦ | ♦♦♦ | ♦ |
| Gaseous effect | ♦♦♦ | ♦♦♦ | ♦♦♦ | ♦♦♦ | 0 |

♦♦♦ = full effect.
♦ = little effect.
0 = no effect.

EXAMPLE 4

The active substance was made into a 10% scattering agent and a 25% emulsifiable solution and tested in sandy-loamy soil. The scattering agent was strewn on the surface and incorporated to a depth of a 20 cm. by means of hoe. The emulsifiable solution was taken up in two litres of water per m.$^2$ of soil surface and poured on the surface. A further 4 litres of water per m.$^2$ was subsequently poured on. The size of the plot was 1 m.$^2$ and a duplicate testing area was selected with 4 control plots. The soil temperature during the treatment was 9.5°. 5 weeks after the treatment two samples of soil were removed per plot by 4 probes, and examined for nematode content in the laboratory. (Amount of soil extracted=2×20 ml.)

The following table shows the average percentage kill found compared with the control values, the latter being given in absolute figures.

Table

Living parasitic nematodes found: Average values from 2 experiments of 20 ml. of soil each, for N-methyl-cyclopentene-(2)-yl-dithiocarbamate.

| Form of treatment | Dose, g./m.² | Percent kill | | |
|---|---|---|---|---|
| | | Meloidogyne larvae | Pratylenchus sp. | Remaining parasitic nematodes |
| 10% scattering agent. | 20 | 100 | 100 | 100 |
| | 40 | 100 | 100 | 100 |
| 25% emulsifiable solution. | 10 | 100 | 100 | 100 |
| | 20 | 100 | 100 | 100 |
| | 40 | 100 | 100 | 100 |
| Controls, absolute figures. | | 143 | 67 | 43 |
| | | 150 | 214 | 35 |
| | | 164 | 174 | 87 |
| | | 147 | 74 | 40 |

EXAMPLE 5

The action of N-monomethyl-cyclopentene-(2)-yl-dithiocarbamate against Meloidogyne sp.; Pratylenchus sp. and other parasitic nematodes was tested in a field. Tomatoes, stringbeans and melons were planted on the nematode infested test ground, in plots of 4 m.². The active substance was tested in the form of dust and as an emulsion. The active substance was strewn on the surface in its pulverized form and incorporated to a depth of 20 cm. by means of a hoe. The emulsion concentrate emulsified in 10 l. of water was applied to each plot, followed by watering with 10 l. of water. The test ground consisted of loose, sandy clay, humus soil. 4 weeks after the application samples of soil were removed to determine the effectiveness of the treatment.

The test for the effectiveness of the treatment consisted not only in establishing the nematodicidal action, determined by soil analysis (on 4×20 cc. of earth), and the examination of the roots for knot infestation but also in the dtermination of the crop of tomatoes, stringbeans and melons.

Soil analysis showed that when the active substance is applied as dust in amounts of 10, 20 and 40 g. of N-monomethyl-cyclopentene-(2)-yl-dithiocarbamate per m.² 100% of all the nematodes are destroyed.

The roots of tomatoes and melons (those of the stringbeans were not examined) showed practically no knot infestation when 20 or 40 g. of the active substance per m.² was applied in the form of a 10% scattering agent. At most only one or the other knot could be detected.

When 40 g./m.² of N-monomethyl-cyclopentene-(2)-yl-dithiocarbamate was applied as a watery emulsion, the crop (total weight of plant) was greatly increased for all three plants and the crop of tomatoes and stringbeans amounted to 200% of that, which was harvested from the control plots of untreated, nematode infested soil.

EXAMPLE 6

20 parts of the active substance according to Example 1 or 2 are dissolved in a mixture of 48 parts of diacetone alcohol, 16 parts of xylene and 16 parts of an anhydrous, high molecular weight, condensation product of ethylene oxide with higher fatty acids. This concentrate may be diluted with water to give emulsion of any desired concentration.

EXAMPLE 7

40 parts of active substance, e.g. N-dimethyl-cyclopentene-(2)-yl-dithiocarbamate are mixed with 2–4 parts of a wetting agent, e.g. a sulphuric acid ester of an alkylpolyglycol ether, 1–3 parts of a protective colloid, e.g. spent sulphite liquor, and 55 parts of an inert solid carrier material, such as for example, kaolin, bentonite, chalk or kieselguhr, and then finely ground in a suitable mill. The wettable powder obtained may be mixed with water and gives very stable suspension.

EXAMPLE 8

5 parts by weight of active substance, e.g. N-diethyl-cyclopentene-(2)-yl-dithiocarbamate are mixed with 95 parts of a carrier material in powder form, e.g. sand or calcium carbonate. The mixture is then granulated. Before the granulation, the above mixture or a mixture richer in active substance, e.g. from 10 parts of active substance and 90 parts of calcium carbonate, can be admixed with a multiple, e.g. 100–900 parts, of a possibly water soluble, artificial fertilizer, e.g. ammonium sulphate.

EXAMPLE 9

By mixing 50 parts of the active substance according to Example 1, 45 parts of xylene, 2.5 parts of an ethylene oxide condensation product of an alkylphenol and 2.5 parts of a mixture of the sodium salts of dodecyloxy-ethoxyethyl-sulphuric acid and dodecylethoxyethoxyethyl-sulphuric acid, a solution emulsifiable in water is obtained.

What is claimed is:

1. A dithiocarbamate of the formula

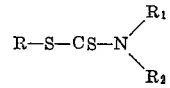

wherein R is a member selected from the group consisting of cyclopentene-(2)-yl-, cyclopentyl-, chloro-cyclopentene-(2)-yl, bromo-cyclopentene-(2)-yl, chloro-cyclopentyl, bromo-cyclopentyl, hydroxy-substituted cyclopentene-(2)-yl- and hydroxy-substituted cyclopentyl, and, $R_1$ and $R_2$ are each a member selected from the group consisting of hydrogen and lower alkyl.

2. A dithiocarbamate according to claim 1 wherein $R_1$ is hydrogen and $R_2$ is lower alkyl.

3. A dithiocarbamate according to claim 2 wherein $R_2$ is methyl.

4. N-methyl-cyclopentene-(2)-yl-dithiocarbamate.

5. N-dimethyl-chlorocyclopentene-(2)-yl-dithiocarbamate.

References Cited by the Examiner

UNITED STATES PATENTS 3,078,273   2/1963   Harman et al. _____ 260—455

CHARLES B. PARKER, *Primary Examiner.*

IRVING MARCUS, DANIEL D. HORWITZ, DALE R. MAHANAND, *Assistant Examiners.*